(12) United States Patent
Bayley et al.

(10) Patent No.: US 7,313,305 B2
(45) Date of Patent: Dec. 25, 2007

(54) DISPLAY

(75) Inventors: Paul Andrew Bayley, Hereford (GB); Anthony Cyril Lowe, Hampshire (GB)

(73) Assignee: Screen Technology Limited, Cambridge (GB)

( * ) Notice: Subject to any disclaimer, the term of this patent is extended or adjusted under 35 U.S.C. 154(b) by 0 days.

(21) Appl. No.: 10/513,830

(22) PCT Filed: May 8, 2003

(86) PCT No.: PCT/GB03/01974

§ 371 (c)(1),
(2), (4) Date: Jul. 14, 2005

(87) PCT Pub. No.: WO03/096076

PCT Pub. Date: Nov. 20, 2003

(65) Prior Publication Data

US 2005/0286846 A1 Dec. 29, 2005

(30) Foreign Application Priority Data

May 9, 2002 (GB) .................................. 0210659.9

(51) Int. Cl.
*G02B 6/06* (2006.01)
(52) U.S. Cl. ........................................... 385/116
(58) Field of Classification Search ................. 385/116
See application file for complete search history.

(56) References Cited

U.S. PATENT DOCUMENTS

| 4,605,283 A | * | 8/1986 | Stanton ....................... 359/453 |
| 4,767,186 A | * | 8/1988 | Bradley et al. ............. 359/452 |
| 4,904,049 A | | 2/1990 | Hegg |
| 5,394,254 A | | 2/1995 | Cheng |
| 5,502,457 A | * | 3/1996 | Sakai et al. .................... 345/87 |
| 5,959,711 A | | 9/1999 | Silverstein et al. |
| 6,031,954 A | | 2/2000 | Higuchi |

FOREIGN PATENT DOCUMENTS

| EP | 0485235 | | 5/1992 |
| EP | 0485235 A2 | * | 5/1992 |
| EP | 0747738 | | 12/1996 |
| EP | 0821248 | | 1/1998 |
| EP | 0896232 | | 2/1999 |
| WO | 95/01584 | | 1/1995 |

* cited by examiner

*Primary Examiner*—Michelle Connelly-Cushwa
*Assistant Examiner*—Chris Chu
(74) *Attorney, Agent, or Firm*—Renner, Otto, Boisselle & Sklar, LLP

(57) ABSTRACT

An image display comprises an image display device for generating a viewable image; and an optical angular selector (290) for selecting an angular range of light to form the viewable image, the optical angular selector having an array of substantially parallel light transmission guides (260) each comprising a light-guiding region (270) to promote propagation of light incident upon the light-guiding region within a range of angles of incidence by refraction and/or total internal reflection and an absorbing material (310) peripherally arranged with respect to the light-guiding region to absorb light incident upon the light-guiding region outside the range of angles of incidence.

13 Claims, 6 Drawing Sheets

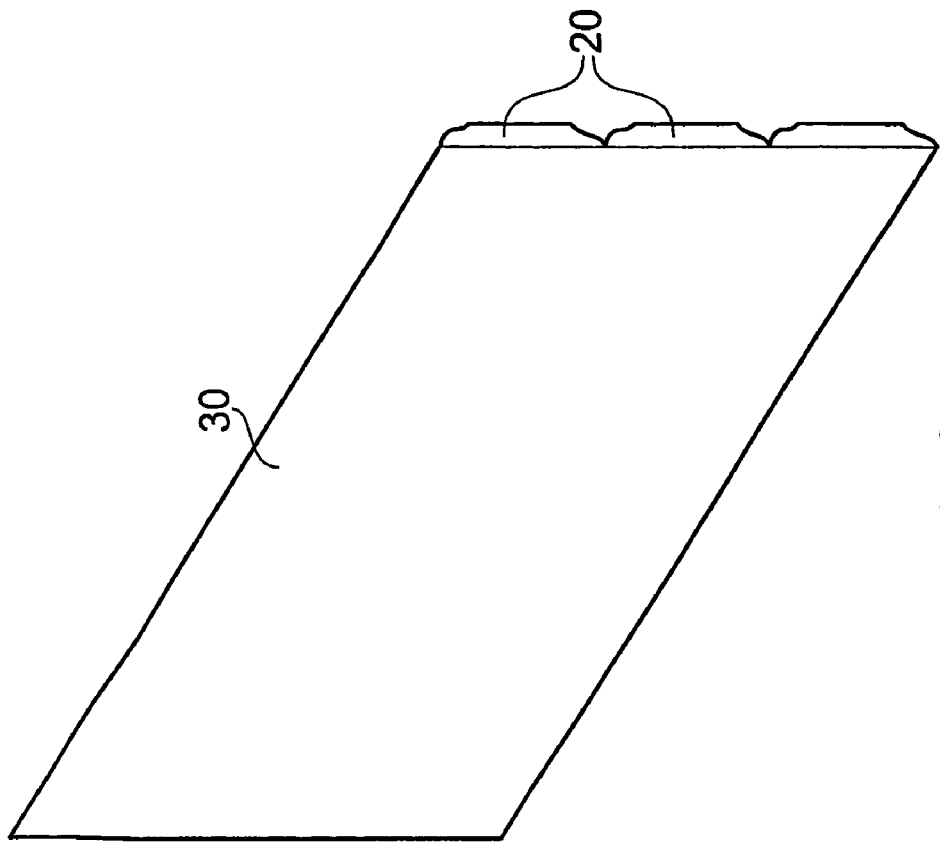
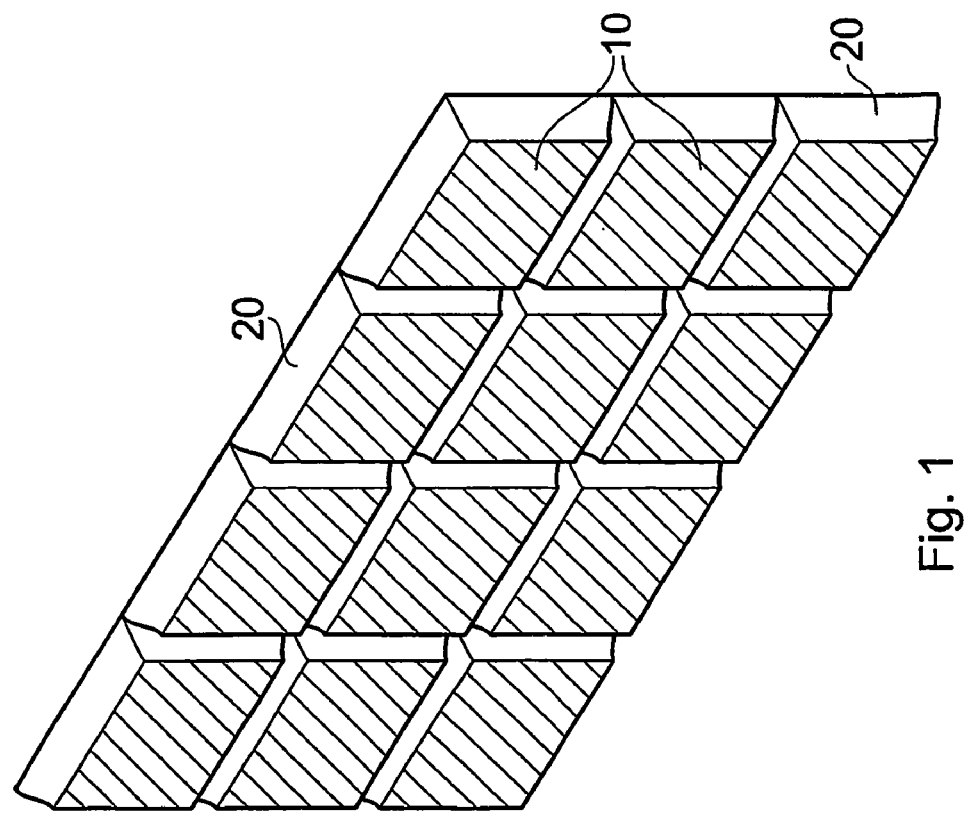

DISPLAY

This application is a national phase of International Application No. PCT/GB03/01974 filed May 8, 2003 and published in the English language.

FIELD OF THE INVENTION

This invention relates to displays.

BACKGROUND

The technology behind flat-panel displays, such as liquid crystal or plasma displays, has advanced to the stage where a single display can be economically manufactured to about the screen size of a modest domestic television set. To increase the display size of a single-unit display beyond this level introduces dramatically greater costs, lower manufacturing yields and other significant technical problems.

To provide larger displays, therefore, a hybrid technology has been developed whereby multiple smaller rectangular displays are tessellated to form the required overall size. For example, a 2×2 tessellated array of 15 inch diagonal displays, with appropriate addressing electronics to route pixel information to the appropriate sub-display, would provide a 30 inch diagonal display.

A drawback of this type of arrangement is that the active area of an individual display, that is to say, the area of the front face of the display on which pixel information is displayed, does not extend to the very edge of the physical area of the display. The technologies used, whether plasma, liquid crystal or other, require a small border around the edge of the active display area to provide interconnections to the individual pixel elements and to seal the rear to the front substrate. This border can be as small as a few millimetres, but still causes unsightly dark bands across a tessellated display.

Various solutions have been proposed to this problem, most of which rely on bulk optic or fibre optic image guides to translate or expand the image generated at the active area of the individual sub-displays.

For example, U.S. Pat. No. 4,139,261 (Hilsum) uses a wedge structure image guide formed of a bundle of optical fibres to expand the image generated by a panel display so that by abutting the expanded images, the gap between two adjacent panels, formed of the two panels' border regions, is not visible. The input end of each fibre is the same size or less than a pixel element. The optical fibres are aligned, at their input ends, with individual pixel elements of the panel display, so that the pixel structure of the display is carried over to the output plane of the image expander. Other image guides formed in this way may translate the image to provide a border-less abutment between a pair of adjacent panels.

A problem which occurs in this type of arrangement will now be described. In a display such as a backlit liquid crystal display, illumination is provided by light-emitting elements (e.g. LEDs, fluorescent tubes) behind the LCD panel. The light passes through LCD pixel elements which control the brightness and colour to be displayed at that pixel position. From there, the light passes into the image guide. If the backlight is incident on the pixel elements at greater than a certain angle, part of the output of each pixel may in fact pass into a part of the image guide intended to carry light from an adjacent pixel. This pixel cross-talk could cause a reduction in spatial resolution and contrast at the output (viewing) plane.

So to reduce the problem of cross-talk, it has been proposed that a collimated backlight arrangement should be used. An example of such an arrangement would provide a light source (e.g. a spaced array of white LEDs), the light from which is homogenised by a crossed pair of "Brightness Enhancing Films" manufactured by 3M Corporation and also passed through a collimator comprising an array of fine tubes or channels oriented along a direction between the light source and the display panel. The tubes have inner surfaces made of or coated with a suitable material such that light striking the inner surface is substantially absorbed. In common with most collimators, this arrangement works by attenuating light outside a defined range of incident angles.

A disadvantage of such an arrangement is that it provides an angular attenuation which is more severe than is actually required. To explain this point, reference will be made to FIGS. 7 and 8 of the accompanying drawings.

FIG. 7 schematically illustrates an array of channels forming a collimator as described above. Each channel has a length l and a width (a diameter in the case of a cylindrical channel) w. As drawn, incident light reaches the channels from the bottom of the page and collimated light is output towards the top of the page.

The angle of incidence is defined in the sense shown in FIG. 7. The minimum angle which can be passed, $\theta_{min}$, is defined by $\tan(\theta_{min})=l/w$. Light at angles of incidence less than $\theta_{min}$ is completely attenuated (assuming an ideal absorption at the inner surface of each channel).

However, some light incident at angles greater than $\theta_{min}$ is also attenuated. FIG. 7 illustrates light incident at $\theta_1$, greater than $\theta_{min}$. Because the light enters the channel at a position displaced from the edge of the channel, it still strikes the inner, absorbing, wall of the channel and is attenuated. So, $\theta_{min}$ is the minimum angle of incidence at which light entering at the very edge of the channel is passed. For angles of incidence greater than $\theta_{min}$, the attenuation is also a function of lateral position of entry across the channel.

This attenuation profile is schematically illustrated in FIG. 8, which shows an example angular distribution of the source light and of the collimated light at the output of the collimator of FIG. 7, for angles of incidence decreasing from 90° (normal incidence), to $\theta_{min}$ and then below.

SUMMARY

This angular response characteristic means that a substantial amount of light within the desired angular range (angles of incidence greater than $\theta_{min}$) is in fact attenuated. This leads either to a loss of brightness or to a need to provide a more powerful light source, in turn leading to increased power consumption and cooling requirements.

This invention provides an image display comprising:

an image display device for generating a viewable image; and an optical angular selector for selecting an angular range of light to form the viewable image, the optical angular selector having an array of substantially parallel light transmission guides each comprising a light-guiding region to promote propagation of light incident upon the light-guiding region within a range of angles of incidence by refraction and/or total internal reflection and an absorbing material peripherally arranged with respect to the light-guiding region to absorb light incident upon the light-guiding region outside the range of angles of incidence.

The invention provides a display having an improved angular selector. The angular selector has an array or set of channels, each of which can support light propagation by total internal reflection and/or refraction, for a certain range of angles of incidence defined by a critical angle. So, within this range of angles of incidence, light is passed by the channels whatever its lateral position of incidence on the input end of the channels. Outside of this range, the light impinges on the outer surface of the channels and is absorbed.

The result is that the amount of light wasted in angular selection can be dramatically reduced in comparison with the arrangement of FIG. 7. In experimental trials, an improvement in efficiency has been measured.

Although a graded index structure could be used, for ease of fabrication it is preferred that the light transmission guides comprise a core region having a core refractive index; and a cladding covering at least a portion of the core region and having a refractive index lower than the core refractive index. Preferably the cladding completely covers the core light guide between an input end and an output end of the light transmission guide. Alternatively an air-clad or gas-clad structure could be used.

In some embodiments, the angular selector is a discrete component forming part of a backlight arrangement or arranged to perform angular selection on light emerging from the display. In other embodiments, the angular selector could be a secondary or other function of an image guide, for example an image guide disposed to receive display light from the image display device having a plurality of light transmission guides arranged so that an array of pixel positions at the input to the image guide is mapped to an array of pixel positions at the output of the image guide, the output of the image guide providing a viewing surface. Such image guides are particularly useful in tiled or tessellated large-screen systems of the type referred to above.

An absorbing material in the form of a powder, planar (e.g. film) or linear (e.g. fibre) material could be used, in which case the powder, film or fibre could even be disposed amongst the light transmission guides of the angular selector or an image guide acting as the angular selector. The powder or fibre or the like need not be in a specific optical contact with the light transmission guides, but could be generally randomly dispersed amongst the light transmission guides. In fact, it is preferred that substantially no optical contact occurs between the absorber and the light transmission guides. (Of course, the skilled person will appreciate that in any random, pseudo-random or near-random system of this nature, some optical contact will occur stochastically). In this case, light not transmitted through the light transmission guides by internal reflection or refraction might emerge from the outer surface of the guides and be absorbed by the absorbing material. This would have the added benefit of avoiding cross-talk between the light transmission guides.

However, in other embodiments it is preferred that the absorbing material forms a layer covering at least a portion of the cladding.

In order to provide a nominally complete extinction of light outside of the desired angular range, it is preferred that the absorbing layer extends from an input end of each light transmission guide to at least a distance along each guide at which light incident upon the guide at a critical angle, the critical angle being the minimum incidence angle with respect to the plane of the input end for which total internal reflection within the core light guide will occur, will strike the core/cladding interface.

In one arrangement, the display device is a transmissive display device having a backlight source; and the angular selector is arranged between the backlight source and the display device so as to control the angular distribution of light from the backlight source incident on the display device. In another arrangement the angular selector is disposed at an output of the display device so as to control the angular distribution of light output by the display device.

This invention also provides an optical angular selector having an array of substantially parallel light transmission guides each comprising a light-guiding region to promote propagation of light incident upon the light-guiding region within a range of angles of incidence by refraction and/or total internal reflection and an absorbing material peripherally arranged with respect to the light-guiding region to absorb light incident upon the light-guiding region outside the range of angles of incidence.

Various other respective aspects and features of the invention are defined in the appended claims. Features from the dependent claims may be combined with features of is the independent claims as appropriate and not merely as explicitly set out in the claims.

DESCRIPTION OF THE DRAWINGS

Embodiments of the invention will now be described, by way of example only, with reference to the accompanying drawings in which:

FIG. 1 is a schematic isometric rear view of a tiled array of display panels;

FIG. 2 is a schematic isometric front view of the array of FIG. 1;

DETAILED DESCRIPTION

Figure 3:
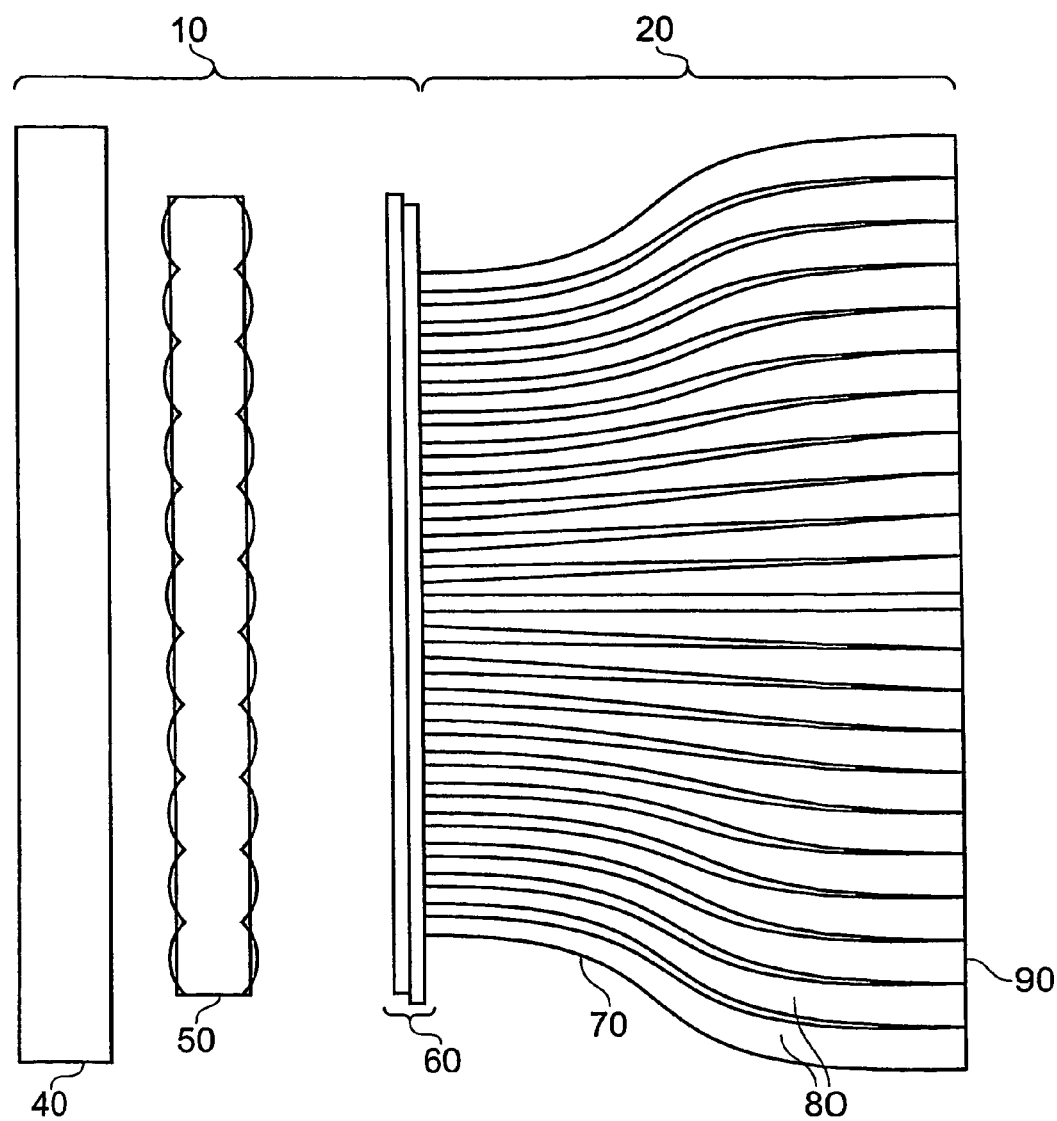
FIG. 3 is a schematic side view of a display comprising a light source, a collimator/homogeniser, a display panel and an image guide.

FIG. 1 is a schematic isometric rear view of a tiled array of display panels.

The array comprises four display panels in a horizontal direction and three display panels in a vertical direction. Each display panel comprises a light emitting surface 10 and an image guide 20.

The light emitting surfaces 10 are each arranged as a plurality of pixels or picture elements. In practice, they would include, for example, a back light arrangement, focusing, collimating and/or homogenising optics and a liquid crystal panel or the like, but much of this has been omitted for clarity of the diagram.

The light emitting panels each display portions of an overall image to be displayed. The portions represent adjacent tiles in a tessellated arrangement. However, because of the need to run electrical connections and physical support around the edge of the light emitting surfaces 10, they cannot be directly abutted without leaving a dark band or "black matrix" in between. So, the light guides 20 are used to increase the size of the image from each light emitting surface 10 so that the output surfaces of the light guides 20 can be abutted to form a continuous viewing plane.

This arrangement is shown in FIG. 2 which is a schematic isometric front view of the array of FIG. 1. Here, the output surfaces of the light guides 20 abut so as to form a substantially continuous viewing surface 30.

FIG. 3 is a schematic side view of a display comprising a light source 40, a collimator/homogeniser 50, a liquid crystal panel 60 and a light guide 70.

The light source 40 and the homogeniser 50 are shown in highly schematic form but in general terms are arranged to provide the back light required by the liquid crystal panel 60.

The liquid crystal panel 60 may be of a type which uses a white or other visible colour back light and provides liquid crystal picture elements to modulate that back light for that display. Alternatively, the liquid crystal panel 60 may be a photo luminescent panel which employs an ultra-violet back light and modulates the ultra-violet light onto an array of phosphors to generate visible light for display.

The image guide 70 comprises an array of light transmission guides 80, each of which carries light from a particular area on the liquid crystal panel 60 to a corresponding particular area on an output surface 90. In doing so, the light transmission guides are arranged to diverge so that the area covered on the output surface 90 is physically larger than the image display area on the liquid crystal panel 60. This, as described above, allows an array of displays as shown in FIG. 3 to be abutted without an unsightly black matrix at the viewing plane.

Figure 4:
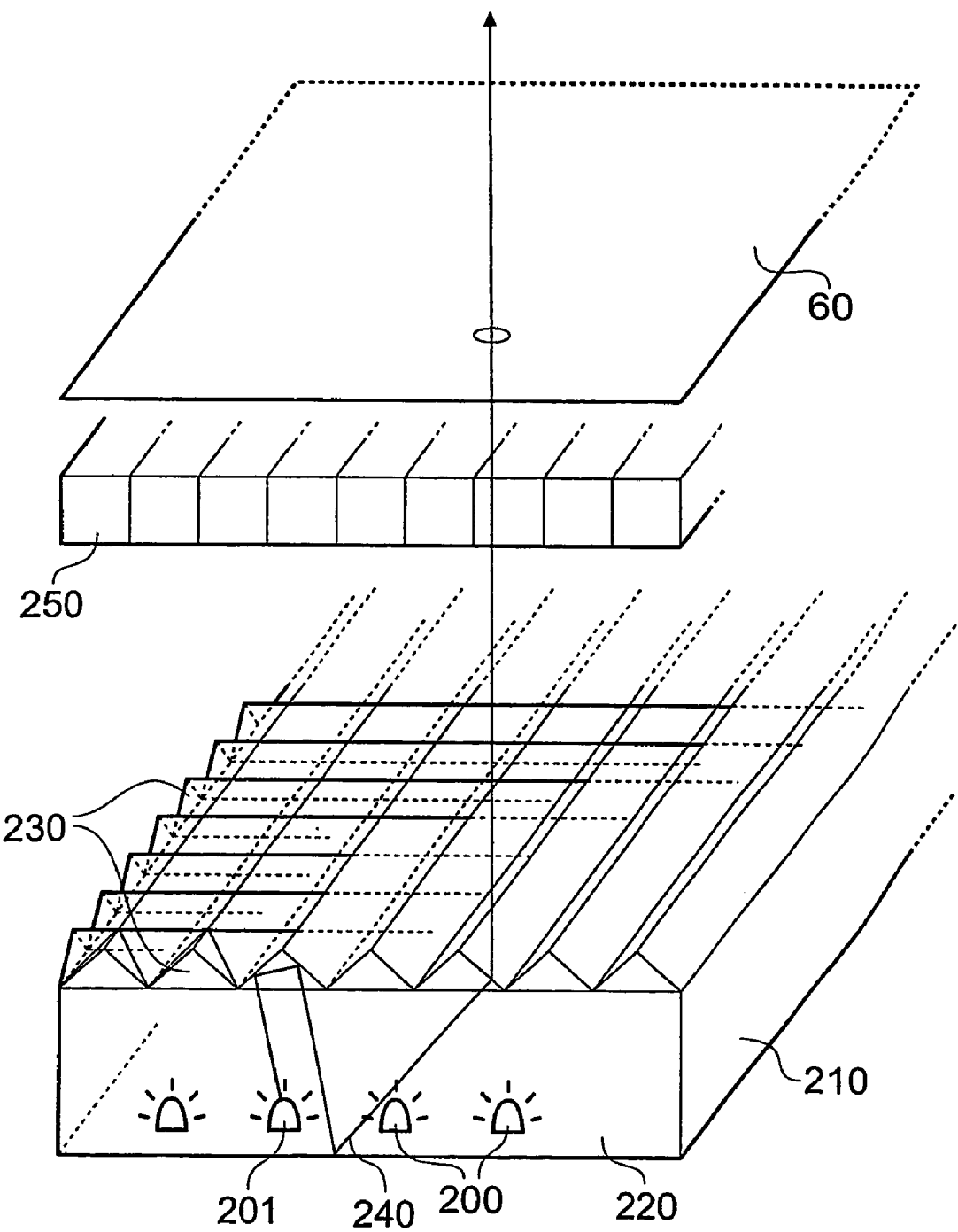
FIG. 4 schematically illustrates a light source and collimator arrangement.

FIG. 4 schematically illustrates a light source and collimator arrangement. Light is provided by a set of white LEDs 200 housed in an open fronted box 210. The inner surface 220 of the box 210 is generally reflecting, being for example white or mirrored. A white surface is preferred because it gives a diffused reflection rather than the specular reflection which would be obtained from a mirrored surface.

The LEDs are arranged to radiate predominantly in an upward direction as shown on the drawing. The face of the box in the direction of radiation of the LEDs (the upper face in this example) is open. That is to say, it is not formed of the same reflecting material as the remainder of the box but instead is covered by crossed sheets of so-called "brightness enhancing film" (BEF) 230 produced by the 3M company. BEF is a transparent ridged structure which acts to reflect light which is normally incident (or near to normal incidence) on the underside of the film. However, light which is non-normally incident is passed and tends to be refracted so as to be closer to the normal as it leaves the film. This process is illustrated for a schematic ray 240 from an LED 201.

Two sheets of BEF 230 are used with the ridge axes of the ridged structures at 90° to one another.

The combination of the internally reflecting box 210, the array of spaced LED sources 200 and the crossed BEF sheets 230 provides a generally collimated source of light so that the majority of light leaving the crossed BEF sheets 230 is within a certain angle of the normal to those sheets.

In order to select light within a required collimation angle, the light then passes through a collimator 250. The collimator 250 is formed of an array of light guides, an example of which will be described with reference to FIG. 5 below. The light guides have an associated "critical angle", which defines a range of angles of incidence over which light is passed by the collimator 250. Incident light outside of this range is not passed by the collimator 250.

As light emerges from the collimator 250 it is incident on the LCD panel 60.

Figure 5:
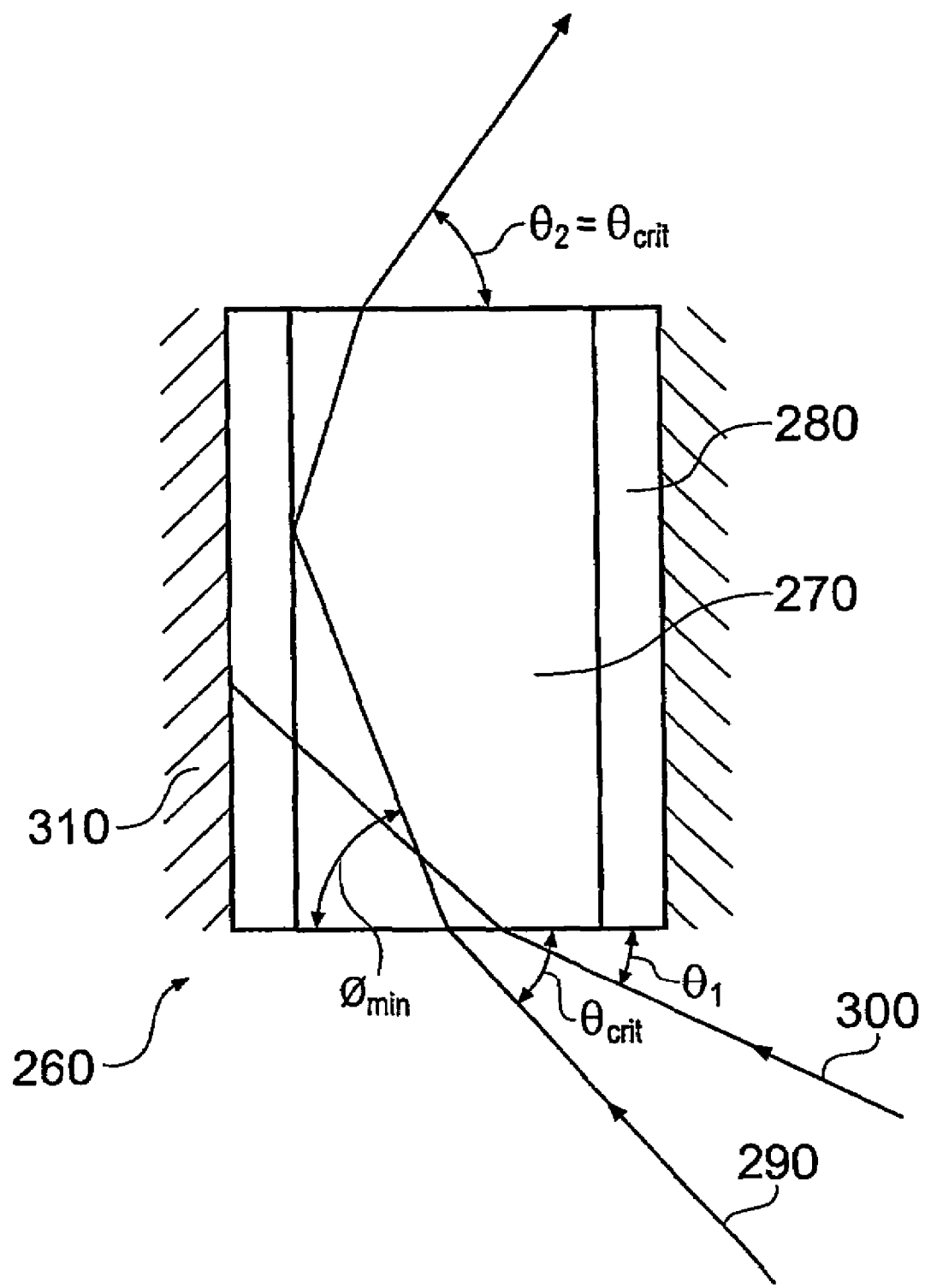
FIG. 5 schematically illustrates a channel in the collimator shown in FIG. 4.
Figure 8:
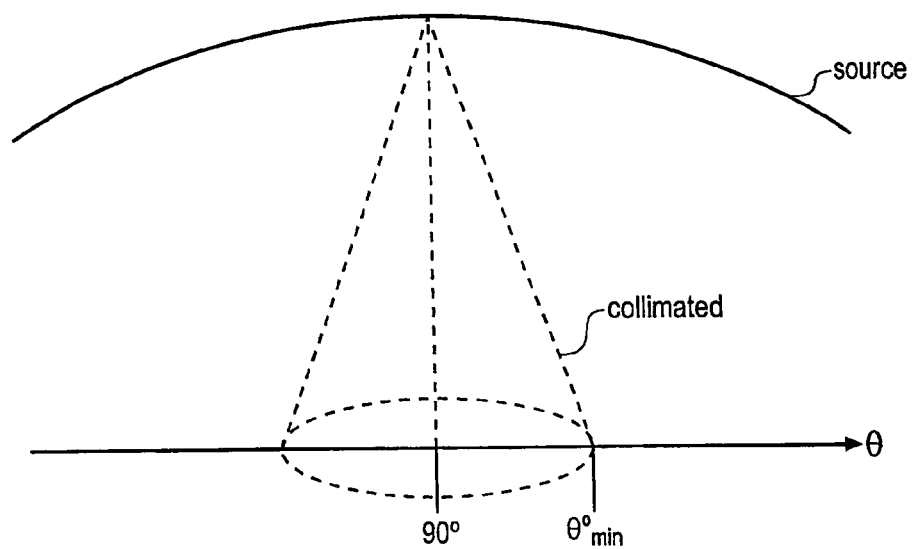
FIG. 8 schematically illustrates an angular distribution of source light and collimated light at the output of the collimator of FIG. 7.

FIG. 5 schematically illustrates a channel or light guide in the collimator 250 of FIG. 4.

Each channel 260 comprises a light-guiding core 270 surrounded by a cladding region 280. The core 270 and cladding 280 may be [plastics, glass or other appropriate materials and have appropriate refractive indices to promote light propagation by total internal reflection. In order to propagate by total internal reflection, light must be incident at least a certain angle of incidence referred to as the critical angle. In FIG. 5, the critical angle is shown as $\theta_{crit}$, so that a schematic incident ray 290 propagates by total internal reflection to emerge at the output (upper in FIG. 5) end of the channel. A schematic ray 300 having an angle of incidence $\theta_1$ less than the critical angle $\theta_{crit}$ does not propagate by total internal reflection.

It may be noted that propagation by total internal reflection depends on the angle of incidence of the light but not on the lateral position of incidence across the input end of the channel.

The cladding 280 is surrounded by an absorbing material 310, for example an absorbing paint or the like which may be applied by spraying, dipping or other suitable process if discrete light transmission guides are used. So, light which does not propagate by total internal reflection (e.g. the schematic ray 300) impinges on the absorbing material 310 and is absorbed.

The channel is formed to be sufficiently long that, whatever the lateral position of incidence of the light, if the light's angle of incidence is less than $\theta_{crit}$ then that light will strike the absorbing material 310 and be absorbed. In practice, this means that the relationship between length and width of the channel is as follows:

$\tan(\phi_{min}) = l/w$ where l is the length of the channel, w is the width or diameter of the channel which is typically about 3 mm in the present embodiments, though in other embodiments a suitable value would of course be chosen (e.g. between 1 mm and 20 mm and $\phi_{min}$ is the critical angle within the core medium. (Because of refraction as the light enters the core material, $\phi_{min}$ will not equal $\theta_{crit}$.

Figure 6:
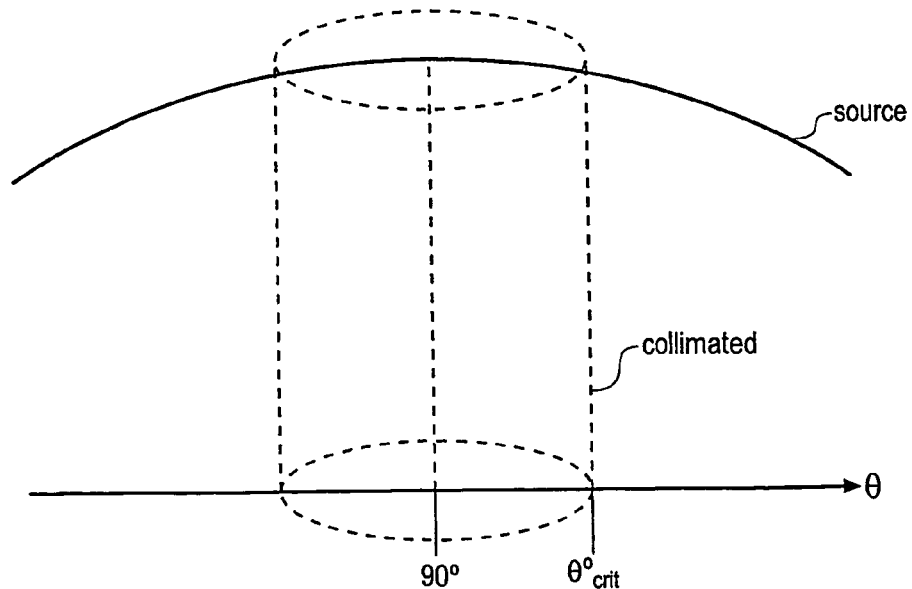
FIG. 6 schematically illustrates an angular distribution of source light and collimated light at the output of the collimator of FIG. 5.

The arrangement is such that substantially all light incident on the input end of the channel 260, whatever its lateral position of incidence, is passed if its angle of incidence is greater than $\theta_{crit}$. Substantially all light having an angle of incidence less than $\theta_{crit}$ is absorbed. The angular distribution of source light and collimated light for the channel of FIG. 5 is shown schematically in FIG. 6.

Of course, it is not necessary to use a core/cladding arrangements giving propagation by total internal reflection. Instead, a so-called "graded index" arrangement may be used providing light propagation (within a certain range of angles of incidence, i.e. within a critical angle) by refraction. As before, the graded index structure would be at least partially covered by an absorbing material 310. Or an air-clad or gas-clad arrangement could be used in which a substantially (at least cross-sectionally) uniform refractive index guide is surrounded by air or gas at ambient or another gas pressure.

Instead of being positioned between the light source and the panel 60, a collimator as described could be positioned between the panel 60 and the light guide 70. This arrangement would be applicable to display panels which themselves are light sources, e.g. light emitting diode-based panels.

In order to manufacture a channel, or an array of channels forming a collimator, each channel could be fabricated as a light-guiding structure of discrete light transmission guides (maybe joined at one or more points along their length to provide support) and then dipped, sprayed or coated with a liquid phase absorber (in effect, a paint) or perhaps the gaps between channels could be at least partially occupied by an absorbing powder such as a graphite powder.

The powder or fibre or the like need not be in a specific optical contact with the light transmission guides, but could be generally randomly dispersed amongst the light transmission guides (Of course, the skilled person will appreciate that in any random, pseudo-random or near-random system of this nature, some optical contact will occur stochastically). In this case, light not transmitted through the light transmission guides by internal reflection or refraction might emerge from the outer surface of the guides and be absorbed by the absorbing material. This would have the added benefit of avoiding cross-talk between the light transmission guides.

If a particulate absorber is used, it is preferred that the particles should be many microns in diameter (e.g. 10 microns to 100 microns), and preferably irregular in shape to minimise or at least reduce optical contact with the fibres. Suitable materials would be carbon black or any other black pigment or dyestuff, such as those based on aniline. Fibres are preferred over particles because they would have a lesser tendency to settle. Again, irregular, twisted or bent fibres would be preferred over smooth straight types. However, since most synthetic textile fibres are now made to mimic the natural types, any black textile fibres could be used in a form in which they could be sprayed or layered into the gaps between the fibres. Typical fibre diameters would be tens of microns (e.g. 10 microns) to a couple of hundred microns (e.g. 200 microns).

In an alternative approach, thin film materials could be interspersed between the light transmission guides to provide an absorbing function. The films could weave (in a regular, near-random or pseudo-random fashion) in amongst the light transmission guides so that the plane of the film is generally parallel with the longitudinal axis of the light transmission guides. Thin plastics films are appropriate, preferably of a dark matt finish, from a few microns thick. In the case of plastics films, by appropriately weaving or positioning the films between the light transmission guides, a desired substantially zero optical contact can be achieved.

The present arrangement provides a lot of flexibility because of its excellent collimation and light mixing properties. For example, instead of white LEDs, separate colours such as red, green and blue LEDs could be used. As long as the relative brightness (which could be controlled by the relevant numbers or the relative light output of the LEDs, or both) is appropriately controlled, collimated white light would emerge because the different coloured light would be well mixed. Again, alternatively, fluorescent tubes or the like could be used instead of LEDs.

Figure 7:
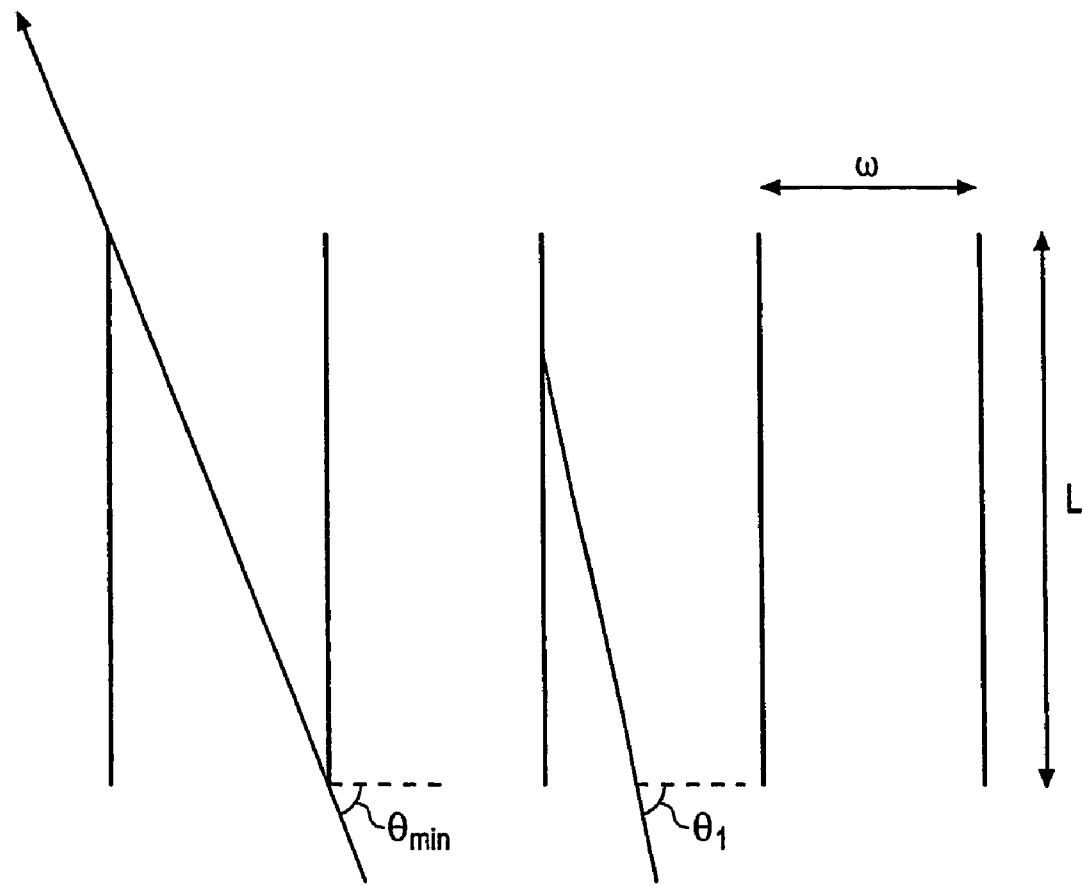
FIG. 7 schematically illustrates an array of channels forming a collimator.

The comparison between the previously proposed arrangement of FIG. 7 and the arrangement of FIG. 5 has been found to improve light output for comparable light sources and collimation angles.

In other embodiments, instead of (or in addition to) the provision of a discrete angular selector, either before the optical input to a transmissive panel or at the output of a transmissive or emissive panel or other display, the angular selection function could be achieved by the image guide 20.

In this situation, any of the measures described above for coating or partially coating the light transmission guides 80 of the image guide with an absorbing material, for example by spraying on or dipping into a light-absorbing paint, may be used, possibly with a forced air flow to assist drainage and drying. Alternatively, or in addition, a planar, particulate or fibrous absorbing material may be disposed amongst the light transmission guides of the image guide. Any of the absorbing materials specified in the present description may be used for this purpose.

It is noted that in the case of an image guide, it may be preferred to use unclad (or air-clad) guides, which is to say that the guides have a substantially uniform refractive index, at least across their cross-section. The guides are spaced apart so that between the guides is an air or gaseous gap, either at ambient or another air or gas pressure.

In the above embodiments, a suitable absorbing paint is Rockhard 700-155-005 (Indestructible Paint Company, Birmingham, UK).

In all of the above embodiments, while it is preferable that the absorbing material should be black or otherwise dark, the skilled person will of course understand that many different colours and finishes (e.g. matt, shiny) of material may be used which provide a useful degree of optical absorption.

The invention claimed is:

1. An optical angular selector comprising:
   an array of light transmission guides that promote propagation of light within a range of angles of incidence by refraction and/or total internal reflection, and each light transmission guide has a longitudinal axis, a substantially uniform refractive index, and is bounded by an air or gaseous region; and
   an absorbing material generally spaced from the light transmission guides to absorb light outside the range of angles of incidence, the absorbing material being formed of a planar or thin film material arranged so that the plane of the material generally is parallel to the longitudinal axis of at least an adjacent light transmission guide.

2. An optical angular selector according to claim 1, wherein the absorbing material is disposed with respect to the light transmission guides so as to have substantially no contact with the light transmission guides.

3. An optical angular selector according to claim 1, wherein the light transmission guides each include:
   a core region having a core refractive index; and
   the air or gaseous region defines a cladding covering at least a portion of the core region and having a refractive index lower than the core refractive index.

4. An optical angular selector according to claim 3, wherein the core region includes the light-guiding region; and the absorbing material is disposed on an outer surface of the cladding, spaced from the core region.

5. An optical angular selector according to claim 1, wherein the absorbing material is substantially randomly disposed amongst the light transmission guides.

6. An optical angular selector according to claim 1, wherein the absorbing material includes a plurality of fibres.

7. An optical angular selector according to claim 6, wherein the absorbing material includes a fibre material having a fibre diameter of between about 10 microns and about 200 microns.

8. An optical angular selector according to claim 6, wherein the fibres are synthetic textile fibres.

9. An image display comprising an image display device for generating a viewable image, and an optical angular selector according to claim 1 for selecting an angular range of light for use in displaying the viewable image.

10. An image display according to claim 9, wherein the image display device includes a transmissive display device and a backlight source; and the angular selector is arranged between the backlight source and the transmissive display device so as to control the angular distribution of light from the backlight source incident on the transmissive display device.

11. An image display according to claim 9, wherein the angular selector is disposed at an output of the display device so as to control the angular distribution of light output by the display device.

12. An image display according to claim 9, wherein the angular selector includes an image guide disposed to receive display light from the image display device, the image guide having a plurality of light transmission guides arranged so that an array of pixel positions at the output of the image guide is mapped to an array of pixel positions at the input of the image guide, and the output of the image guide provides a viewing surface.

13. An image display according to claim 12, comprising a plurality of image guides, wherein the viewing surface of the respective image guides tessellates to form a composite viewing surface.

* * * * *